(12) United States Patent
Bioton et al.

(10) Patent No.: US 9,682,334 B2
(45) Date of Patent: Jun. 20, 2017

(54) SOLID WATER SEPARATION TO SAMPLE SPRAY WATER FROM A CONTINUOUS CASTER

(71) Applicant: Ecolab USA Inc., Naperville, IL (US)

(72) Inventors: Lise Delain Bioton, Leiden (NL); Laia More Roca, Leiden (NL); Erik Fijlstra, Heemstede (NL); Peter de Graaf, Voorburg (NL); Peter Blokker, Broek op Langedijk (NL); Stefanus Hendrikus Maria Vrijhoeven, Leiderdrop (NL)

(73) Assignee: ECOLAB USA INC., Naperville, IL (US)

( * ) Notice: Subject to any disclaimer, the term of this patent is extended or adjusted under 35 U.S.C. 154(b) by 420 days.

(21) Appl. No.: 13/800,842

(22) Filed: Mar. 13, 2013

(65) Prior Publication Data

US 2014/0263083 A1    Sep. 18, 2014

(51) Int. Cl.
| | | |
|---|---|---|
| *B01D 29/62* | (2006.01) | |
| *B01D 29/03* | (2006.01) | |
| *B01D 29/44* | (2006.01) | |
| *B01D 29/90* | (2006.01) | |
| *B22D 11/22* | (2006.01) | |

(52) U.S. Cl.
CPC ......... *B01D 29/03* (2013.01); *B01D 29/445* (2013.01); *B01D 29/908* (2013.01); *B22D 11/225* (2013.01)

(58) Field of Classification Search
CPC .. C02F 1/00; C02F 1/001; C02F 1/004; C02F 1/66; C02F 1/68; C02F 1/685; C02F 1/686
USPC ........ 210/696, 742, 743, 745, 739; 164/451, 164/452, 455, 414, 154.6; 422/14, 82.07, 422/82.08, 527, 534, 535; 436/164, 172, 436/177; 73/61.42, 61.41, 61.59, 863.21, 73/863.23
See application file for complete search history.

(56) References Cited

U.S. PATENT DOCUMENTS

| | | | |
|---|---|---|---|
| 2,158,169 A | * | 5/1939 | Wright .................... 210/806 |
| 3,981,347 A | | 9/1976 | Willim |
| 4,024,764 A | | 5/1977 | Shipman et al. |
| 4,235,280 A | | 11/1980 | Helms et al. |
| 4,444,495 A | | 4/1984 | Bramwell et al. |
| 4,494,594 A | | 1/1985 | Kurzinski |
| 4,699,202 A | | 10/1987 | Gilles |
| 6,280,635 B1 | | 8/2001 | Moriarty et al. |

(Continued)

OTHER PUBLICATIONS

Comparison of Impact, Velocity, Drop Size and Heat Flux to Redefine Nozzle Performance in the Caster by Kristy Tanner Presented at American Iron and Steel Technology Conference (2004).

*Primary Examiner* — John Fitzgerald
*Assistant Examiner* — Alexander Mercado
(74) *Attorney, Agent, or Firm* — Eric D. Babych; Brinks Gilson & Lione

(57) ABSTRACT

The invention is directed towards methods and apparatus for improving the accuracy of monitors measuring the property of spray water used to cool a molten metal strand in a continuous casting operation. The method utilizes a highly effective slid-sieve to remove particles from sample water that would otherwise jam the monitor or would break the monitor. This particle removal results in the monitor providing more accurate measurements which in turn results in lower operating expenses, reduced maintenance costs, and production costs.

20 Claims, 5 Drawing Sheets

(56) References Cited

U.S. PATENT DOCUMENTS

| | | |
|---|---|---|
| 6,312,644 B1 | 11/2001 | Moriarty et al. |
| 6,315,809 B1 | 11/2001 | Morita et al. |
| 6,358,746 B1 | 3/2002 | Moriarty et al. |
| 6,360,973 B1 | 3/2002 | Stilli |
| 6,645,428 B1 | 11/2003 | Morris et al. |
| 6,755,236 B1 * | 6/2004 | Sivilotti ............. B22D 11/0685 164/431 |
| 7,179,384 B2 | 2/2007 | Moriarty et al. |
| 7,549,797 B2 | 6/2009 | Myhre |
| 7,601,789 B2 | 10/2009 | Morris et al. |
| 7,799,151 B2 | 9/2010 | Folkman et al. |
| 7,875,720 B2 | 1/2011 | Morris et al. |
| 7,905,271 B2 | 3/2011 | Schmitz et al. |
| 8,066,054 B2 | 11/2011 | Cowlishaw |
| 8,216,117 B2 | 7/2012 | Brotzki et al. |
| 8,220,525 B2 | 7/2012 | Cho et al. |
| 2010/0237025 A1 * | 9/2010 | Geibel et al. .................. 210/791 |
| 2011/0278217 A1 * | 11/2011 | Inoue ............................ 210/499 |
| 2011/0315623 A1 * | 12/2011 | Motakef ....................... 210/499 |

* cited by examiner

SOLID WATER SEPARATION TO SAMPLE SPRAY WATER FROM A CONTINUOUS CASTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates generally to methods of, and apparatuses for accurately monitoring the properties of spray water used in a continuous caster system. As described for example in U.S. Pat. Nos. 7,549,397, 8,220,525, and 8,066,054, continuous casting is a method of converting molten metal into semi-finished metal products such as billets, blooms, or slabs, and is useful for high volume and continuous operations. Typically in continuous casting, molten metal is collected in a special trough called a tundish and is then passed at a precisely controlled rate into a primary cooling zone. In the primary cooling zone the molten metal comes into contact with a solid mold (often made of copper and often water/liquid cooled). The solid mold draws heat from the molten metal causing a solid "skin" of metal to form around a still liquid core. This solid clad liquid metal is referred to as a strand.

Usually the strand is then passed to a secondary cooling zone in which the stand is positioned within a spraying chamber where a liquid cooling medium (often water) is sprayed against the strand to further cool the metal. Examples of spraying technology used in spraying chambers are described in U.S. Pat. Nos. 4,699,202, 4,494,594, 4,444,495, 4,235,280, 3,981,347, 6,360,973, 8,216,117, and 7,905,271. While being sprayed the strand is also supported by rollers which prevent the solid walls of the strand from suffering breakouts (the leakage of liquid metal out from cracks in the strand's solid skin) caused by ferro-static pressure (pressure caused by the different properties of the moving solid and liquid metal pressing against each other). The more solid strand is then passed on to subsequent cooling, shaping, and/or cutting steps.

As detailed in U.S. Pat. Nos. 7,799,151 and 4,024,764, proper casting operations require precise control and adjustment over all of the components used. Of particular importance is fine control over the spraying of the cooling medium at the spray. Scientific paper: *Comparison of Impact, Velocity, Drop Size and Heat Flux to Redefine Nozzle Performance in the Caster* by Kristy Tanner Presented at American Iron and Steel Technology Conference (2004) describes how such factors as droplet size, spray density distribution, and droplet velocity are all crucial in proper cooling techniques. This is because they affect the formation of a steam layer or vapor layer on the strand which affects heat flux distribution and localized cooling of the strand (all of which impact the overall quality of the resulting metal). Knowing the chemical composition of the droplets can be used to determine these factors as well as give insight into corrosion and cooling rates. This however requires real time knowledge of the exact properties of the cooling medium present in the spraying chamber. Such understanding however is complicated by the nature of the spraying chamber.

Often a number of particles can end up in contact with the cooling medium and they in turn change the properties of the medium and make measurement of those properties difficult. For example lubricants (like mold powder such as that described in U.S. Pat. No. 6,315,809) are often placed on the solid mold, which are pulled into the secondary cooling zone by the strand. Once there the lubricants can react with super-hot water to form complex chemistries including highly reactive hydrofluoric acid. This, along with the intense pressure and temperature can cause additional particles to form from corrosion of bits of metal from the strand or from the pipes or walls of the spraying chamber itself. This in turn fills any collected cooling medium used for sampling with particles that can block piping used for collecting sprayed medium, or which can damage the monitors themselves.

It is therefore useful and desirable to provide methods and apparatus to separate solid particles from condensed liquid cooling medium used in a continuous casting operation. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed to a method of accurately sampling the properties of cooling medium that has been sprayed at a strand within a spray chamber of a continuous metal casting process. The method comprises the steps of: passing a sample of cooling medium through a separation device. The separation device comprises an angled flow surface constructed and arranged such that medium flows over the surface and fluid and fine particles from the medium sample pass through the flow surface and on to a monitor. Large particles in the medium do not pass through but rather slide down and off the angled flow surface thereby inhibiting the formation of clogs over the surface. The monitor is constructed and arranged to determine a chemical or physical property of the cooling medium. The absence of clogs allows for continuous monitoring of the medium during casting operations. Were clogs to form, the monitor would not receive sufficient/any samples and the casting operation would therefore be "blind" to effects resulting from medium composition.

The method angled flow surface may comprise a plurality of extending members. The extending members may have a tapered configuration being wider at the top and narrower at the bottom. The tops of adjacent extending members may define a plurality of pores. The surface may be positioned at an angle of between 20° to 60° preferably between 30° to 50°, relative to a horizontal axis and allows for the passage of a sample through the pores plate at a rate of 10-100 liters/minute preferably at a rate of 20-80 liters/minute. The separation device may be positioned directly below the strand or below a particular piece of equipment prone to corrosion.

The surface may comprise a plurality of pores having a cross sectional aperture of between 0.15 mm to 1 mm and/or a cross sectional area of between 0.15 $mm^2$ to 1 $mm2^?$ preferably between 0.3 mm to 0.8 mm. The separation device may have a surface plate with a surface area of 0.1 to 1 $m^2$, preferably between 0.3 to 0.8 $m^2$, along which a plurality of slits are disposed.

The sample may comprise mixed liquid composed by condensed liquid medium that was previously vapor in the spray chamber, direct spray water, and splashes. The monitor may be a device selected from the list consisting of: pH meter, fluorescence meter, oxidation reduction potential meter, corrosion measurer, temperature, conductivity and any combination thereof. But for the sample having passed through the separation device the flow of fluid to the monitor might have become clogged from particles present in the medium. The monitor may determine the degree of corrosion that is occurring in the spray chamber. The monitor may determine if the composition of the cooling medium will cause corrosion in excess of a pre-determined amount. The method may further comprise the step of raising or lowering the pH of the medium in response to a property measured by the monitor and dosing an appropriate amount of corrosion inhibitor. The sample may be fed into a scale pit or back into the spray chamber after it has been analyzed by a monitor. The particles passing on to the monitor may overwhelmingly comprise particles that have been introduced into the medium within 5 minutes of the monitor measuring them.

Additional features and advantages are described herein, and will be apparent from, the following Detailed Description.

BRIEF DESCRIPTION OF THE DRAWINGS

A detailed description of the invention is hereafter described with specific reference being made to the drawings in which:

FIG. 1 is a side view schematic illustration of a of a separation device.

FIG. 2 is a perspective view schematic illustration of a of a separation device.

FIG. 3 is a side view schematic illustration of a slid-sieve.

FIG. 4 is a perspective view schematic illustration of a slid-sieve.

FIG. 5 is a perspective view schematic illustration of a of a clad separation device.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Caster" means a device utilizing a continuous casting process to convert molten metal into semi-finished solid metal products such as billets, blooms, or Slabs.

"Cooling medium" means a fluid (typically a liquid), sprayed at a strand to further cool and solidify the strand, it typically comprises or consists essentially of water but can also include or consist of mist and/or air.

"Monitor" means a device constructed and arranged to measure at least one physical or chemical characteristic and to output a signal or display in response to that measurement, it includes but is not limited to any one or more of the methods and/or devices described in U.S. patent application Ser. Nos. 13/095,042 and/or 13/730,087 and U.S. Pat. Nos. 6,645,428, 6,280,635, 7,179,384, 6,312,644, 6,358,746, 7,601,789, and 7,875,720.

"Spray Chamber" means a portion of a caster in which a strand is sprayed with a cooling medium to further solidify it, usually a spraying chamber is the secondary cooling zone positioned just after a solid mold (the primary cooling zone) but it can be the first source of cooling molten metal or can be positioned after other cooling devices or after other spray chambers.

"Strand" means a stream of metal having a relatively solid outer skin and being molten within the skin.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference, in light of the above, in the event that a term can only be understood if it is construed by a dictionary, if the term is defined by the *Kirk-Othmer Encyclopedia of Chemical Technology,* 5th Edition, (2005), (Published by Wiley, John & Sons, Inc.) this definition shall control how the term is to be defined in the claims.

In at least one embodiment of the invention, a sample of cooling medium passes from a continuous casting spray chamber through a separation device before it is passed on to a monitoring device which determines chemical and or physical properties of the cooling medium. The cooling medium can comprise water or can consist essentially of water. The cooling medium sample can be condensed from medium which vaporized when it came into contact with the strand. The medium can contain acid (such as hydrofluoric acid) formed from a reaction between the medium and a lubricant used in the mold. The medium can contain metal particles from corroded or eroded pieces of the strand or from the equipment (such as pipes or walls of the secondary cooling zone).

Generally the separation device can be positioned below the strand. In many cases however the water to be monitored is water specific to a highly localized area which would be indicative of water effects occurring at a specific piece of equipment or zone of the spray chamber. As a result flow rate cannot be too high lest water from other locations slosh in and dilute the sample losing the information a specific locality's water would contain.

The separation device can also be strategically positioned at locations close to or directly below sites highly prone to corrosion. The separation device can be constructed and arranged to allow the passage of fine metallic particles but block the passage of large metallic particles. This allows for the presence of sufficient metal in the sample to offer a useful gauge of corrosion occurring in the caster while allowing the sample to transit in a form easy to test and which is not likely to damage monitoring equipment.

The separation device can be positioned and constructed and arranged such that it collects a representative sample of the liquid medium. In at least one embodiment slid-sieve allows for a flow of 10-100 liters/minute preferably for a flow of 20-80 liters/minute. At this speed, enough medium enters the monitor to provide a representative sample but not so much that it cancels out the various chemical effects occurring in the caster.

In at least one embodiment the separation device is constructed and arranged to facilitate monitoring of variability in the water chemistry inside the caster spray chamber. To accomplish this there needs to be enough of a flow through the separation device to a monitoring device to get a reading that is reflecting the process on real time. As an example, to get a reading within 5 minutes from the process water, the water samples flow should be 10-25, preferably 15 liters per min as an optimum.

In at least one embodiment the slid sieve is positioned at a location more prone to collect particulate matter. For example, locations either directly beneath a source of particles (such as the strand or a piece of equipment prone to corrosion) or directly downstream from the flow vector of the spray will accumulate more particles than other locations.

Figure 1:
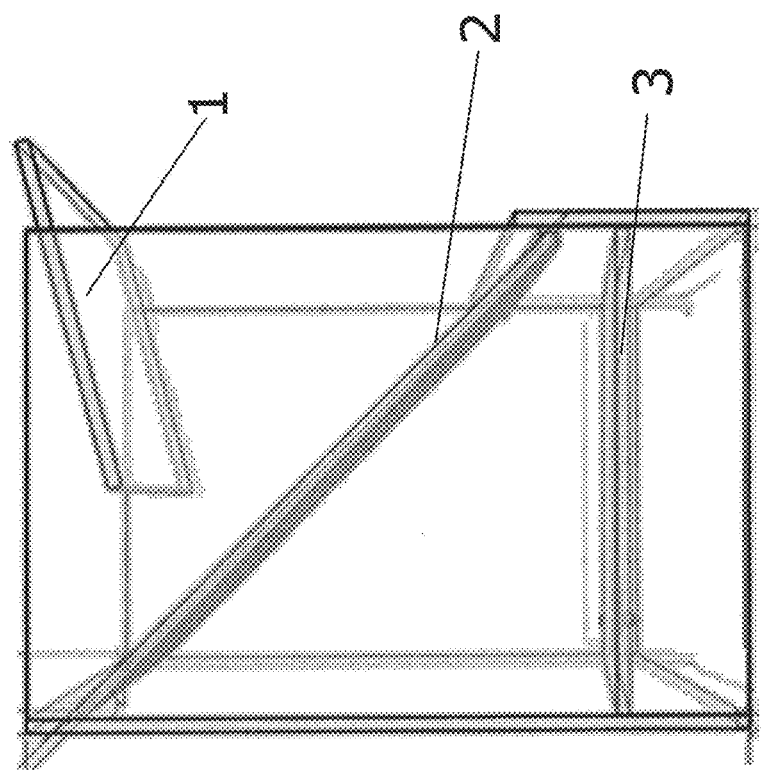
Figure 2:
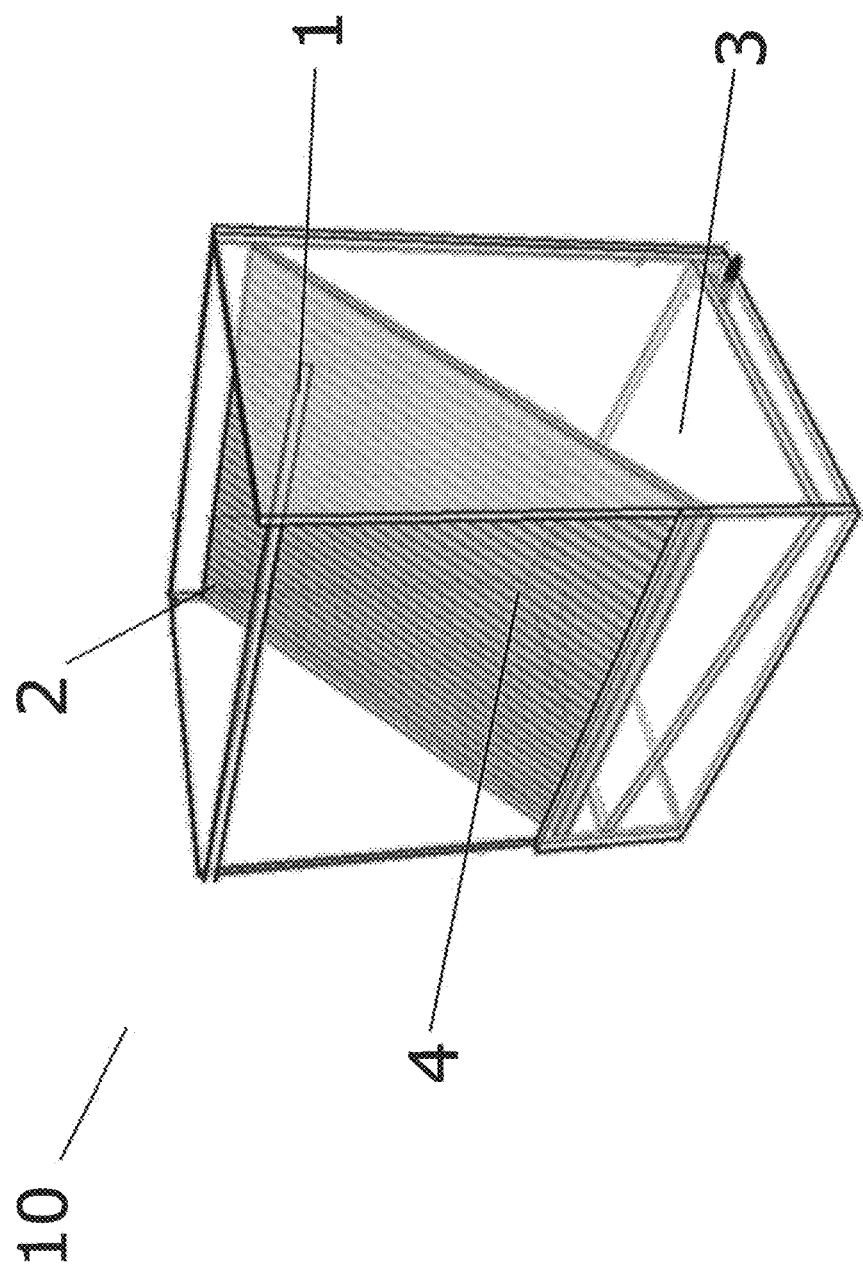

Referring now to FIGS. 1 and 2 there are shown at least one example of a separation device (10). The separation device (10) comprises a first angled surface (1) upon which a fluid sample will flow into the device. Fluid flows from the first angled surface (1) to a second angled surface (2). The second angled surface comprises one or more pores through which fluid and fine particles can flow but coarse matter will not flow. This allows for the separation of fine particles which have only recently corroded or eroded at a location extremely local to the separation device to pass along with the fluid towards a monitor but keep coarser matter which is often agglomerates of previously eroded/corroded matter residing in the spray chamber. The fluid then passes onto a third angled surface (3). In at least one embodiment a flow of fluid running along the second angled surface (2) carries coarse particles off and away from the second angled surface (2) without them passing down to the third angled surface (3).

In at least one embodiment the angle(s) of the first and/or second angled surfaces (1, 2) are established such that an optimal flow rate is achieved. In at least one embodiment the angle is between 20° to 60° preferably between 30° to 50°, relative to a horizontal axis. This allows fluid to wash away deposited particles from the plate's surface while also allowing fluid containing a representative amount of fine particles to pass through to the third angled surface (3). The angled surface (3) collects the now filtered fluid sample and passes it on to a monitoring device.

In at least one embodiment the second angled surface may comprise one or more or a plurality of pores through which the fluid and fine matter can flow but through which the coarse material cannot flow. Such pores may have a cross-sectional area of between 0.15 mm$^2$ to 1 mm$^2$ and/or a cross sectional aperture of between 0.15 mm to 1 mm, preferably between 0.30 mm$^2$ to 0.8 mm$^2$. In at least one embodiment the surface area of the filter plate (2) is preferably 0.1 to 1 m$^2$, more preferably between 0.3 to 0.8 m$^2$ In at least one embodiment the size of the pores can be proportional to the tendency of the location where the separation device is located to accumulate particles. In at least one embodiment part or all of the separation device is constructed out of a material that is resistant to acid, heat, and/or water based corrosion. It may be in part or in all constructed out of stainless steel.

Figure 3:
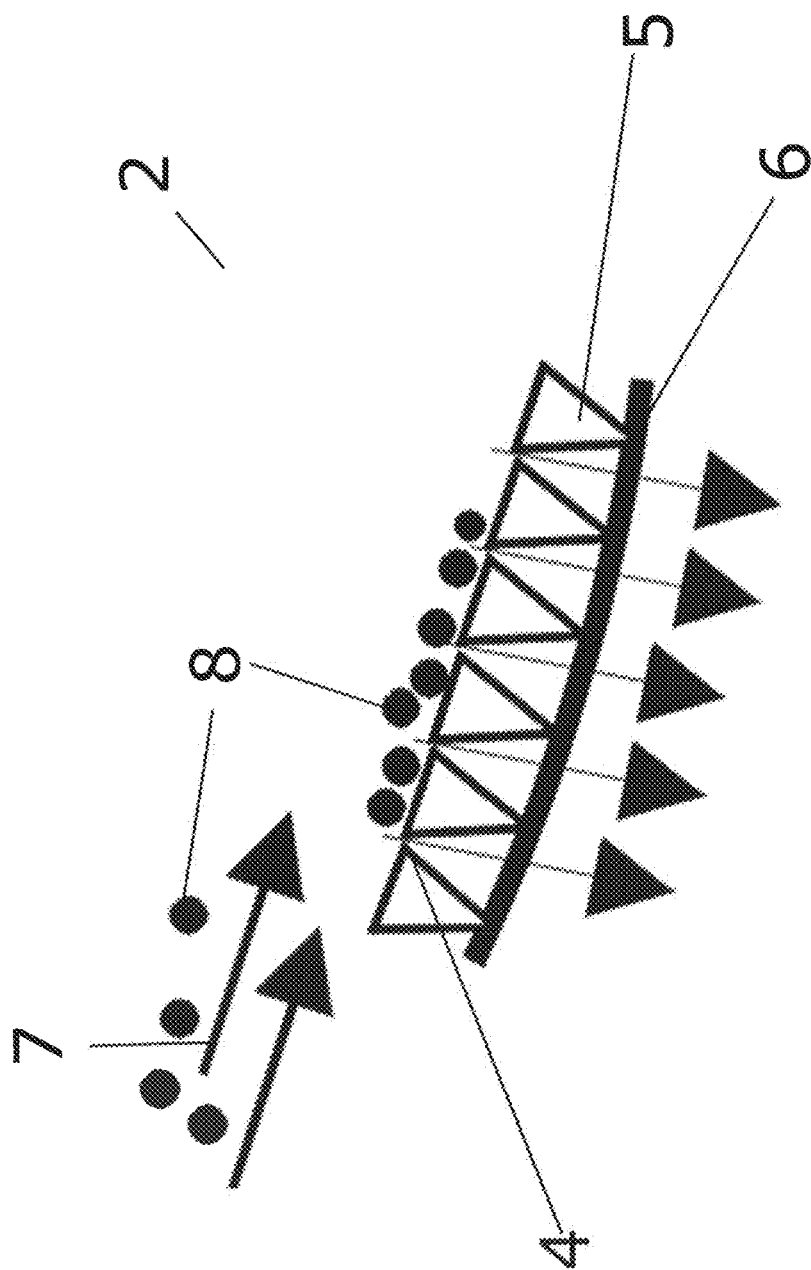
Figure 4:
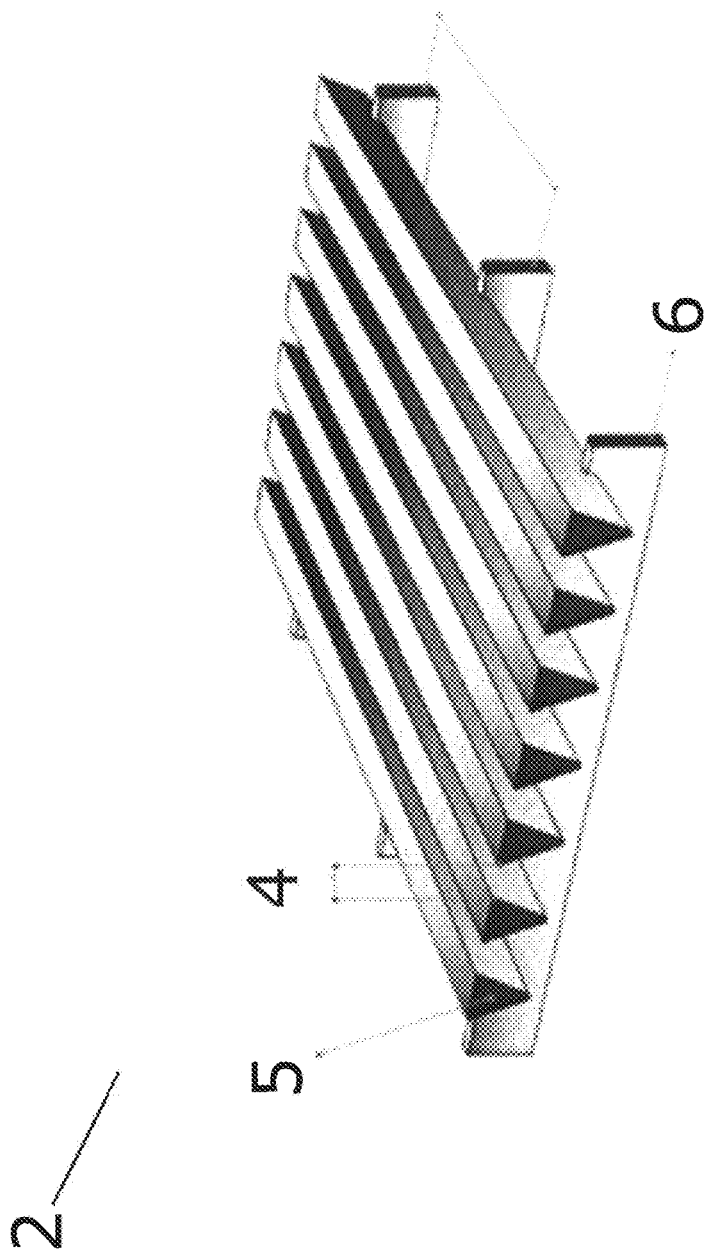

Referring now to FIGS. 2, 3, and 4 it is shown that the second angled surface (2) may comprise one or more slid-sieves. The slid sieve comprise a plurality of extending members (5). The extending members have a tapered configuration such that their upper surface (upon which a flow of medium (7) will land) is wider than their lower surface. Narrow slot openings (4) between adjacent extending members (5) define the pores through which fine particles and fluid will pass but through which coarse matter (8) shall not.

As illustrated in FIG. 2, the slot openings (4) may be positioned to extend at least in part along a vertical and horizontal axis. As a result medium will slosh along it until it falls off its lower end. While so traversing the slot openings (4), fluid and fine particles have a long period of time to become separated from the coarse matter. As illustrated in FIG. 3, the slot openings (4) may be positioned to extend at least in perpendicular to the vertical and horizontal axes. As illustrated in FIG. 4 the extending members (5) may be supported by engagement to one or more support rods (6). An array of extending members (5) and support rods (6) may define in part or in totality the second angled surface (2).

Figure 5:
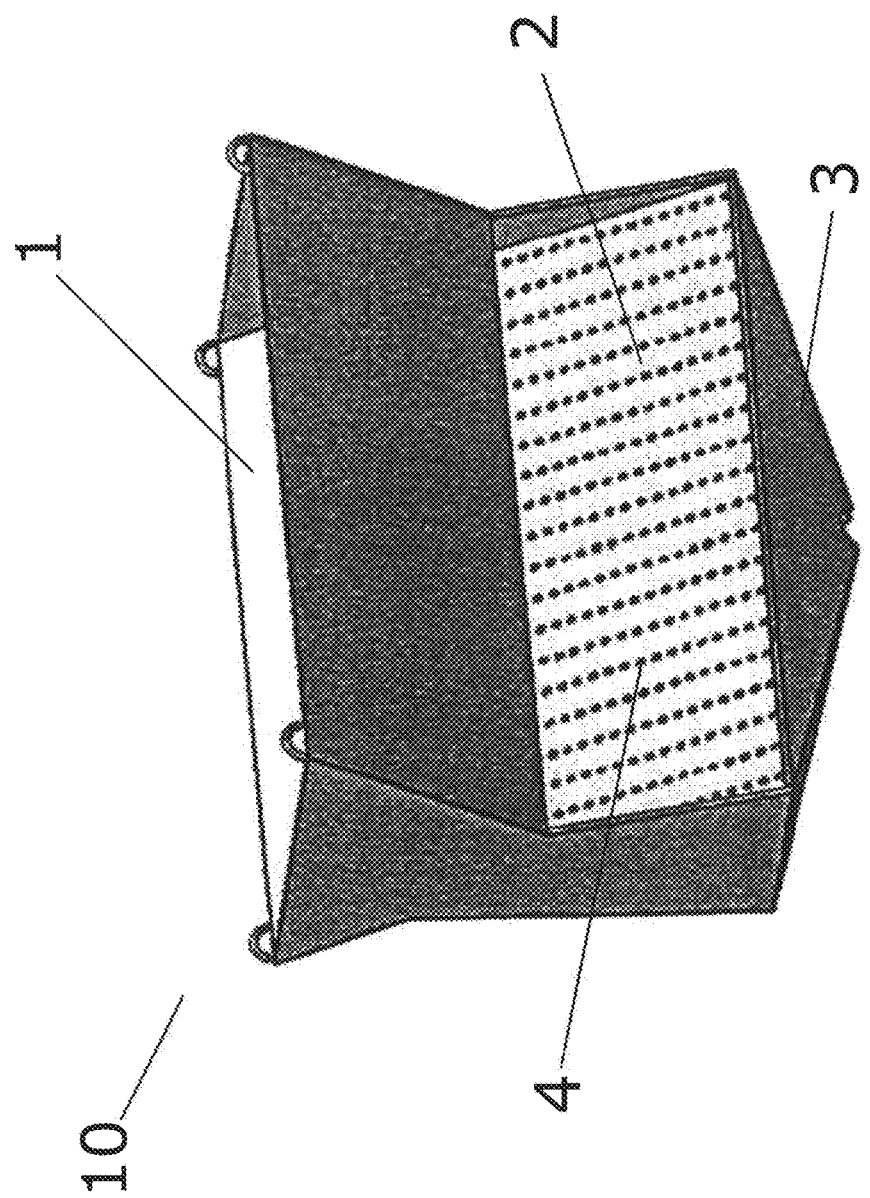

As illustrated in FIGS. 2 and 5, the separation device may be constructed and arranged so that the third angled surface (3) directs the flow of fluid in a direction generally perpendicular to the flow direction of the second angled surface (2).

In at least one embodiment the samples passes on from the separation device to a monitor device selected from the list consisting of: pH meter, fluoride measurement prober, oxidation reduction potential meter, corrosion measurer, conductivity, temperature, and any combination thereof. By removing the coarse particles form the sample, more accurate measurements can be taken, more frequent measurements can be taken, and the measurements are easier to take and will not damage the monitoring equipment. In at least one embodiment the monitor and/or the feed equipment thereto would be damaged or would not be able to correctly measure a sample unless it had first passed through the slid sieve.

The arrangements of one or more of the components of the separation device (10) are particularly well suited for the nature of a caster system spray chamber. Because casters often cast metals at high speeds, slight changes in the thermal environment can cause large variations in heat flux in the mold. As a result differing or inconsistent properties or effects of the cooling medium can result in widely different rates of heat transfer and thermal stress. For example, certain materials if present in the cooling medium will result in random deposits on the mold that lead to uneven heat transfer. Similarly certain particles in water can form random copper oxide formation on copper molds or microbiological infestations of medium can result in random iron oxide deposition on molds. Other materials such as organic carbon may cause some of the medium to foam which inconsistently alters the cooling properties of some of the medium. Such effects can cause uneven heat transfer on the molds which will result in breakouts, excessive mold wear, and cracking and defects in the molds. As a result a real-time analysis of the composition of the cooling medium is essential to understanding how the cooling medium will perform and to preserve the operational efficiency of the chamber as a whole. Because the separation device sloughs off coarse matter but allows fluid and fine particulates to pass on to the monitor it can facilitate long term real-time analysis of the conditions in the cooling medium without being impaired by the need to constantly unclog the input flow of samples to the monitor. As a result, the invention allows users to operate the caster and simultaneously monitor for medium based problems for a longer period of time than a similar monitor without the separation device would allow for.

In at least one embodiment the angle of the surface and/or the flow rates of medium over the surface and/or fluid with fines through the pores are optimized for the particular coarseness, population of particles sizes, and feed rate of medium in a continuous casting operation.

In at least one embodiment the sample that has passed on through the separation device is then analyzed by a monitor to determine the degree of corrosion that is occurring. Optionally the composition of spray water that is then sprayed at the strand is changed to reduce corrosion.

In at least one embodiment the sample that has passed on through the separation device is then analyzed to determine if it will cause corrosion in excess of a pre-determined amount. Optionally the composition of spray water that is then sprayed at the strand is changed to reduce corrosion.

In at least one embodiment, in response to a measured parameter of the spray medium sample, the pH of further spray is raised or lowered and/or one or more chemical additives are added to the medium.

In at least one embodiment, in response to a measured parameter of the spray medium sample, the sprayed cooling medium either is or is not recirculated and re-sprayed at the strand.

In at least one embodiment, in response to a measured parameter of the spray medium sample, the sprayed cooling medium either is stored for future use or is disposed of as waste.

In at least one embodiment the sample that has passed through the separation device is then analyzed to determine if it the metal particles within it are from the strand or from particular pieces of caster equipment. Based on this analysis decisions can be made regarding whether to change a process condition (metal feed rate, metal temperature, spray properties), the composition of the strand, to repair/replace equipment, and how long to maintain caster operation, to cease/commence operation, and any combination thereof.

In at least one embodiment the prior to passing through the separation device the ratio of strand derived metal to equipment derived metal is so great that but for passing through the slid sieve, the ratio would have drowned out the signal for detecting the equipment derived metal and would have resulted in the corrosion of the equipment going undetected or its apparent magnitude being erroneous.

In at least one embodiment the monitor is used to determine the rate at which vaporous medium is condensing into liquid medium, and but for the removal of the particles, the monitor would have provided an erroneously low rate of condensation because the particles were preventing entry of the samples into the monitor.

EXAMPLES

The foregoing may be better understood by reference to the following examples, which are presented for purposes of illustration and are not intended to limit the scope of the invention.

A number of samples of cooling water sprayed in a spray chamber were passed through a separation device. The second angled surface had a static screen having 0.15 mm porous size. Various angles and orientation were tested (Table 1).

200 g of collected particles were dispersed in 4 liters of water and the mixture was thrown on top of the grid. Part of the water and particles passed through the static screen; the other part was not collected by the sample device. The particles as well as the water passing through have been weighted and compared with the total amount sprayed to determine the removal efficiency (Table 1).

The best orientation was the one combining the best water flow collection with a minimum of particles entering the sampling device. As shown on the table 1, the best orientation was horizontal with an angle for the grid of 45 degrees.

TABLE 1

| | | orientation tests | | | |
|---|---|---|---|---|---|
| Angle | Static screen position | Water collected (L)* | Water collected (%) | Particles passing through (%) | Ratio water/ particles |
| 45 | Vertical | 2.75 | 69 | 36 | 2 |
| | horizontal | 3.5 | 88 | 17 | 5 |
| 60 | Vertical | 1.75 | 44 | 21 | 2 |
| | horizontal | 3.8 | 95 | 32 | 3 |

*Water flow collected at OXY2 was between 0.1 to 3.6 m3/h depending on steel grade produced and casting speed.

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of analyzing a cooling medium from a spray chamber of a continuous metal casting process, the method comprising:

passing a sample of cooling medium through a separation device, the separation device comprising an angled flow surface constructed and arranged such that the sample of cooling medium flows over the angled flow surface, fluid and fine particles from the sample of cooling medium sample pass through the angled flow surface and on to a monitor, and large particles in the sample of cooling medium slide down and off the angled flow surface, wherein the angled flow surface comprises a plurality of extending members each having a top and a bottom, the extending members having a tapered configuration being wider at the top and narrower at the bottom and the tops of adjacent extending members defining a plurality of pores; and monitoring the fluid and fine particles obtained from the separation device to determine a chemical or physical property of the cooling medium.

2. The method of claim 1 wherein the angled flow surface is positioned at an angle of between 20° to 60° relative to a horizontal axis.

3. The method of claim 1, wherein the separation device is positioned directly below the strand or below a particular piece of equipment prone to corrosion.

4. The method of claim 1, wherein the plurality of pores have a cross sectional aperture of between 0.15 mm to 1 mm.

5. The method of claim 1, wherein the separation device further comprises a surface plate with a surface area of 0.1 to 1 m².

6. The method of claim 1, wherein the sample comprises a condensed liquid medium formed from a mixture of vapor in the spray chamber, direct spray water, and splashes from the spray chamber.

7. The method of claim 1, wherein the monitor is a device selected from a pH meter, fluorescence meter, oxidation reduction potential meter, corrosion measurer, temperature, conductivity and any combination thereof.

8. The method of claim 1, wherein the separation device reduces clogging of cooling medium passing to the monitor, compared to cooling medium that does not pass through the separation device.

9. The method of claim 1, wherein the monitor determines the degree of corrosion in the spray chamber.

10. The method of claim 1, further comprising the step of raising or lowering the pH of the cooling medium in response to a property measured by the monitor.

11. The method of claim 1, further comprising directing the sample into a scale pit or back into the spray chamber, after it is analyzed by a monitor.

12. The method of claim 1, wherein a majority of the fine particles in the monitor arrive at the monitor within five minutes of their entering the cooling medium.

13. The method of claim 1, in which the coarse particles comprise metal particles corroded or eroded from the strand.

14. The method of claim 1, in which the coarse particles comprise metal particles corroded or eroded from the spray chamber equipment.

15. A method of analzying a cooling medium that has been sprayed at a strand within a spray chamber of a continuous metal casting process, the method comprising:

passing a sample of cooling medium through a separation device, the separation device comprising an angled flow surface constructed and arranged such that the sample of cooling medium flows over the angled flow surface, fluid and fine particles from the sample of cooling medium sample pass through the angled flow surface and on to a monitor, and large particles in the sample of cooling medium slide down and off the angled flow surface, wherein the angled flow surface comprises a plurality of extending members each having a top and a bottom, the extending members having a tapered configuration being wider at the top and narrower at the bottom and the tops of adjacent extending members defining a plurality of pores; and monitoring the fluid and fine particles obtained from the separation device to determine a chemical or physical property of the cooling medium, wherein the coarse particles are metal particles corroded or eroded from the strand, from the spray chamber equipment, or both and wherein a majority of the fine particles passing to the monitor arrive at the monitor within five minutes of their entering the cooling medium.

16. The method of claim 15, wherein the angled flow surface is positioned at an angle of between 20° to 60° relative to a horizontal axis.

17. The method of claim 1, wherein the separation device is positioned relative to the strand such that only cooling medium that has struck a specific piece of equipment in the spray chamber passes through the separation device.

18. The method of claim 1, wherein the angled flow surface allows for the passage of a sample through the pores at a rate of 10-100 liters/minute.

19. The method of claim 5, wherein the surface plate further comprises a plurality of slits.

20. The method of claim 1, further comprising dosing an appropriate amount of corrosion inhibitor in response to a property measured by the monitor.

* * * * *